Patented Sept. 19, 1933

1,927,295

UNITED STATES PATENT OFFICE 1,927,295

PROCESS FOR PRODUCING ACYLATED ESTERS OF HYDROXY-ACIDS

Edward J. Powers, Silver Creek, N. Y.

No Drawing. Application July 24, 1929
Serial No. 380,762

17 Claims. (Cl. 260—106)

My invention relates to a process of acylating and esterifying hydroxy aliphatic acids or their corresponding glycerides or other similar compounds. More particularly, my invention relates to a novel method of manufacturing such compounds as acylated esters at one operation and without the necessity of carrying out two separate reactions.

In the past the production of acylated esters of hydroxy acids or of glycerides has been a lengthy and complicated procedure, it having been necessary, as a rule, to carry out the production of such compounds in at least two steps in order to obtain the desired compound—one step for the acylation and a separate step for the esterification. For example, in the case of the ethyl ester of acetyl lactic acid, it was first necessary to esterify the lactic acid according to one of the customary methods. This compound was next treated with, say, acetyl chloride, thus requiring the additional trouble and expense of preparing the latter compound. According to my new process, these various steps may be combined into one operation which is carried out with the aid of readily available and cheaper types of material than is the case with the methods formerly in use. Other advantages of my new process will appear in the discussion which follows.

The type of compound which may be made by my new process may be represented by the following structural formula:

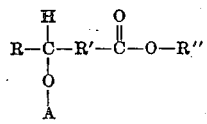

where A is an acyl group such as acetyl, propionyl, butyryl, etc.; R is any aliphatic or aromatic grouping and may contain either saturated or unsaturated linkings; R' is a divalent aliphatic grouping and may contain either saturated or unsaturated linkings; and R'' is any alkyl or aralkyl group such as ethyl, isopropyl, butyl, benzyl, etc. This type of compound may be produced according to my new process by the general reaction illustrated by the equation:

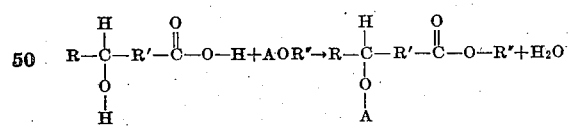

where AOR'' represents any aliphatic or aromatic ester. In place of using the free acid, the glyceride of the latter may be employed with satisfactory results.

My process is best understood by the following specific examples, which it is distinctly understood, are cited merely as illustrations and are not to be interpreted as limiting in any way the general application of my invention.

Example I

Equal weights of castor oil (consisting principally of triricinolein) and ethyl acetate are placed in a round bottomed flask or other suitable vessel. About 3% by weight of a catalyst is incorporated with this mixture and the whole refluxed over a water bath for from 2 to 5 hours. Suitable catalysts are aqueous concentrated hydrochloric acid, dry hydrochloric acid gas, concentrated sulphuric acid, anhydrous sodium bisulphate, concentrated phosphoric acid, benzene sulphonic acid, etc. Under the conditions specified, the reaction indicated by the following equation takes place:

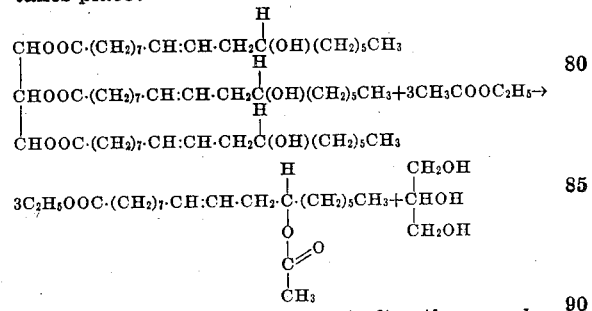

The procedure to be followed after the completion of the reaction depends somewhat upon the particular type of catalyst used to accelerate the reaction. When sodium bisulphate is used as the catalyst the reaction product may be treated as follows. After the glycerine has settled to the bottom of the reaction vessel the upper layer may be decanted, leaving behind the sodium bisulphate catalyst and glycerine. The unconverted ethyl acetate is then removed by vacuum distillation. The residue then consists of the acetylated ethyl ester of ricinoleic acid and unconverted triricinolein. An approximately 50% conversion to the desired product is obtained.

When sulphuric acid is used as the catalyst the glycerine is separated off as above described. The unconverted ethyl acetate is then removed by vacuum distillation, the residue washed with brine until neutral to remove the sulphuric acid catalyst, and finally dried by any of the customary means.

When hydrochloric acid is used as the catalyst a somewhat higher conversion—approximately 60%—is obtained, but the glycerine does not settle out of the reaction mixture as in the cases where catalysts of the character specified above have been employed. In this case, the unconverted ethyl acetate is removed by vacuum distillation and the residue then steam distilled to remove the remainder of the hydrochloric acid.

The acylated esters of ricinoleic acid, glycerides of the latter, or of castor oil may be used with advantage in a number of industries. They are particularly suitable for use as plasticizers in the manufacture of nitrocellulose lacquers. These materials alone exert slow action upon nitrocellulose; when a small amount of a substance such as methyl alcohol, ethyl acetate, etc., is added to the acylated esters the latter become active and fairly rapid solvents of nitrocellulose. Most of the common esters of this type are very high-boiling compounds and hence evaporate from lacquer films or other compositions at an extremely slow rate. The wetting power of these materials for pigments is much greater than that of dibutyl phthalate, one of the commonly used nitrocellulose plasticizing agents, making them more suitable than dibutyl phthalate as a pigment grinding medium.

Example II

Instead of employing triricinolein as the raw material as illustrated in Example I, free ricinoleic acid may be employed, the operating being carried out substantially as above described. On refluxing approximately equal weights of ricinoleic acid and butyl propionate in the presence of 1-3% of anhydrous sodium bisulphate the following reaction takes place with an approximately 60% yield:

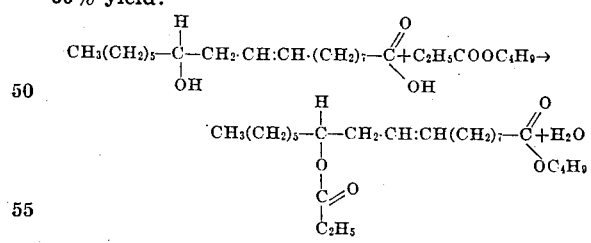

Buyl ester of propionyl ricinoleic acid

Example III

When equal weights of lactic acid and ethyl acetate are refluxed with 5% of sodium bisulphate for 5 hours, the reaction product being thoroughly agitated thruout the duration of the operation, acetyl ethyl lactate is obtained as illustrated by the following equation:

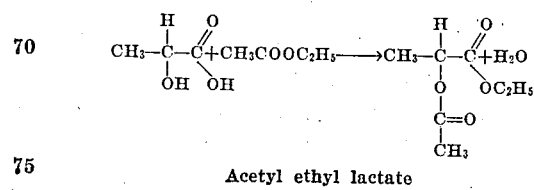

Acetyl ethyl lactate

Example IV

Equal weights of ethyl acetoacetate and castor oil are mixed and to the resulting mixture about 5% by weight of concentrated sulphuric acid added. The resulting product is then refluxed for about 5 hours and the glycerine split off during the reaction allowed to settle out. The upper layer of the reaction product is decanted from the glycerine and vacuum distilled to remove the unused excess of ethyl acetoacetate. The residue is then washed with brine until neutral and finally dried. A yield of approximately 75% of the ethyl ester of acetoacetyl ricinoleic acid is obtained as shown by the following equation:

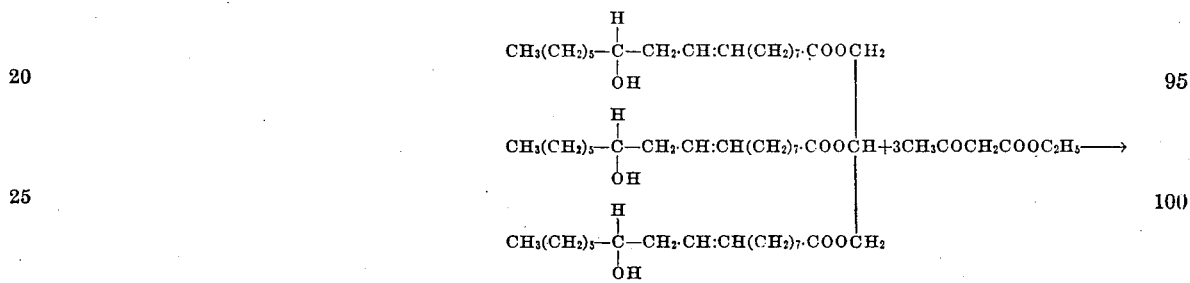

Ethyl ester of acetoacetyl ricinoleic acid

Example V

Tartaric acid is mixed with an amount of butyl acetate in excess of that theoretically required to give the reaction product desired. To this mixture is then added about 5% by weight of concentrated sulphuric acid and the whole refluxed for a period of 3-5 hours. At the end of this time the excess acid may be removed by neutralizing and washing or by any other suitable method, and the excess butyl acetate and the water removed by distillation, followed by drying if necessary. The following equation represents the reaction taking place and the product formed by this procedure:

Diacetyl dibutyl tartrate

In the examples cited above it will be noted that the reactions go only partially to completion, equilibrium being set up between the reacting materials and the products formed therefrom. By removing one or more of the reaction products from the zone of reaction it is possible to obtain practically theoretical yields. For instance, in Example III, instead of using equal weights of lactic acid and ethyl acetate, a fairly large excess of the latter may be added so that the water formed by the reaction may be removed in the form of a constant-boiling mixture with the ethyl acetate or other ester employed. In cases where the ester being employed in the reaction does not form a constant-boiling mixture with water, it is possible to include in the reaction mixture an inert material forming a minimum constant-boiling mixture with water, as for example, liquid coal tar or petroleum hydrocarbons like benzol, toluol, gasoline, etc.

My process is capable of much broader application than merely the cases illustrated above. For example, in place of the specific esters employed in the examples above, I may substitute any other normal or iso-ester of either the aliphatic or aromatic series, as for example, isobutyl acetate, butyl butyrate, propyl formate, ethyl propionate, ethyl benzoate, benzyl acetate, etc. In place of the acids cited above, I may substitute any other hydroxy aliphatic acid or the corresponding glyceride of such acids, as for example, glycollic acid, β-hydroxy-propionic acid, hydroxy-butyric acid, hydroxy-oleic acid, the glyceride of the latter, polybasic-polyhydroxy acids such as tartronic, citric, etc.

It may be seen from the above examples and description that the process of the present invention is applicable to the preparation of esters of the general type

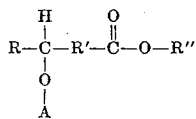

where R represents hydrogen, an alkyl group or an aliphatic radical including the group COOR'', R' represents a direct carbon to carbon linkage or a divalent aliphatic hydrocarbon radical, A is an acyl group, R'' is an alkyl or aralkyl group, and where the radicals A and/or R'' are monovalent.

Thus in the case of the acylated esters of lactic acid, R will represent a methyl group and R' merely a bond between the carbon atoms; in the case of β-hydroxy butyric acid, R will represent a methyl group and R' a methylene group; in the case of ricinoleic acid, R will represent the group CH₃(CH₂)₅— and R' the group —CH₂CH=CH(CH₂)₇—; and in the case of the diacylated ester of tartaric acid, R will represent the complex radical:

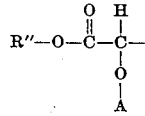

and R' will represent merely a bond between the carbon atoms.

The acyl group A may be an aliphatic group such as acetyl, propionyl, butyryl, or the like, or an aromatic acyl group such as benzoyl; and the group R'' may be an alkyl group such as methyl, ethyl, butyl, and the like, or an aralkyl group such as benzyl.

It is to be noted that this classification of acylated esters of hydroxy aliphatic acids in which the acyl group A and/or the alcohol group R'' are monovalent, definitely excludes such polymerized or resinous materials as would result from the reaction of esters of polybasic acids and polyhydric alcohols.

Now having described my invention, what I claim is:

1. The process for the production of acylated esters of hydroxy aliphatic acids, which comprises reacting an hydroxy aliphatic acid compound selected from the group consisting of hydroxy aliphatic acids and their glycerides with an ester of an organic monocarboxylic acid, said ester having the general type formula A—O—R, wherein A is an acyl group and R is an alkyl or aralkyl group, in the presence of an esterification catalyst, whereby the acyl group of said ester acylates the hydroxy group of said hydroxy aliphatic acid compound and the alcohol group of said ester esterifies the carboxyl group of said hydroxy aliphatic acid compound by replacing the hydrogen of the free acid or the glyceryl radical of the glyceride.

2. The process as claimed is claim 1 in which the hydroxy aliphatic acid compound is an hydroxy aliphatic acid per se.

3. The process as claimed in claim 1 in which the hydroxy aliphatic acid compound is ricinoleic acid.

4. The process as claimed in claim 1 in which the reacting ester is chosen from the group consisting of alkyl and aralkyl esters of aliphatic carboxylic acids, aromatic carboxylic acids, and keto carboxylic acids.

5. The process as claimed in claim 1 in which the hydroxy aliphatic acid compound is ricinoleic acid, and in which the reacting ester is chosen from the group consisting of alkyl and aralkyl esters of aliphatic carboxylic acids, aromatic carboxylic acids, and keto carboxylic acids.

6. The process as claimed in claim 1 in which the reacting ester is an alkyl ester of a monocarboxylic aliphatic acid.

7. The process as claimed in claim 1 in which the reacting ester is an alkyl ester of a fatty acid.

8. The process as claimed in claim 1 in which the reacting ester is butyl acetate.

9. The process as claimed in claim 1 in which the hydroxy aliphatic acid compound is ricinoleic acid, and the reacting ester is butyl acetate.

10. The process as claimed in claim 1 in which the hydroxy aliphatic acid compound is a glyceride of an hydroxy aliphatic acid.

11. The process as claimed in claim 1 in which the hydroxy aliphatic acid compound is castor oil.

12. The process as claimed in claim 1 in which the hydroxy aliphatic acid compound is a glyceride of an hydroxy aliphatic acid, and in which the reacting ester is chosen from the group consisting of alkyl and aralkyl esters of aliphatic carboxylic acids, aromatic carboxylic acids, and keto carboxylic acids.

13. The process as claimed in claim 1 in which the hydroxy aliphatic acid compound is castor oil, and in which the reacting ester is chosen from the group consisting of alkyl and aralkyl esters of aliphatic carboxylic acids, aromatic carboxylic acids, and keto carboxylic acids.

14. The process as claimed in claim 1 in which the hydroxy aliphatic acid compound is a glyceride of an hydroxy aliphatic acid, and in which the reacting ester is an alkyl ester of a fatty acid.

15. The process as claimed in claim 1 in which the hydroxy aliphatic acid compound is castor oil, and in which the reacting ester is an alkyl ester of a fatty acid.

16. The process as claimed in claim 1 in which the hydroxy aliphatic acid compound is a glyceride of an hydroxy aliphatic acid, and in which the reacting ester is butyl acetate.

17. The process as claimed in claim 1 in which the hydroxy aliphatic acid compound is castor oil, and in which the reacting ester is butyl acetate.

EDWARD J. POWERS.